United States Patent [19]

Orr

[11] 4,218,118
[45] Aug. 19, 1980

[54] SLIDE VIEWING APPARATUS

[75] Inventor: James E. Orr, San Antonio, Tex.

[73] Assignee: Visual Sales Corporation, San Antonio, Tex.

[21] Appl. No.: 902,040

[22] Filed: May 2, 1978

[51] Int. Cl.² ............................................. G03B 23/10
[52] U.S. Cl. .................................................. 353/110
[58] Field of Search ........................................ 353/110

[56] References Cited
U.S. PATENT DOCUMENTS

| | | | |
|---|---|---|---|
| 737,940 | 9/1903 | Leatherbarrow | 353/110 |
| 2,461,756 | 2/1949 | Moore | 353/110 |
| 2,570,652 | 10/1951 | Dilks | 353/110 |
| 2,618,197 | 11/1952 | Bousher | 353/110 |
| 3,421,802 | 1/1969 | Itazaqui | 353/110 |

Primary Examiner—Steven L. Stephan
Attorney, Agent, or Firm—Cox & Smith Incorporated

[57] ABSTRACT

A slide viewing apparatus having an enclosure with a projection screen and a projection system including a light source and lens for sequentially projecting images from a plurality of transparencies onto a mirror which reflects the images onto the screen.

8 Claims, 6 Drawing Figures

SLIDE VIEWING APPARATUS

BACKGROUND OF THE INVENTION

This invention relates generally to slide viewing apparatus, and more particularly to an automatic advertising device for displaying images on a screen.

In recent years there has been a tremendous growth in surburban shopping centers and in many cities a reduction in the downtown shopping. Many shopping centers or malls have been developed that have become little cities unto themselves with many different stores sharing a common roof and mall area. There has developed a need for a type of advertising medium that can be utilized in shopping malls, which will expose customers to advertisements of specially priced leader items to induce the customers to shop in a store. Numerous attempts have been made in the past to develop projection display devices for use in advertising. Known U.S. Patents relating to projection devices are as follows: U.S. Pat. Nos. 472,912; 737,940; 1,089,788; 1,107,293; 1,535,131; 1,812,547; 1,870,301; 2,250,297; 2,405,706; 2,461,756; 2,570,652; 2,618,119; 3,072,015; 3,322,035; 3,421,802. Many such projectors such as U.S. Pat. No. 1,812,547 issued to Nowack, et al, disclose a slide carrying rotating disc 4, a drive mechanism 10, including ratchet star 7 which engages another ratchet star 6 to rotate the slide carrying disc in increments to align a transparency with a light and lens. The image projected through the lens is reflected from a mirror 18 onto a screen 19. Another type of projecting device is shown in U.S. Pat. No. 1,089,788 to Quigley. The Quigley device is similar to the device of Nowack, et al, and further includes a shutter means to avoid exposure of portions of a receding picture and an approaching picture.

In order to be commercially feasible, it is necessary that a slide viewing apparatus used for advertising purposes be very simple in construction to minimize the number of moving parts and also to minimize any required maintenance. It is important that such devices be able to operate over extended periods of time without any maintenance other than the changing of slides to reflect additional items for sale. It is also important that the device be simple and inexpensive to manufacture to make it economically feasible for use by a merchant.

BRIEF DESCRIPTION OF THE PREFERRED EMBODIMENT

Figure 1:
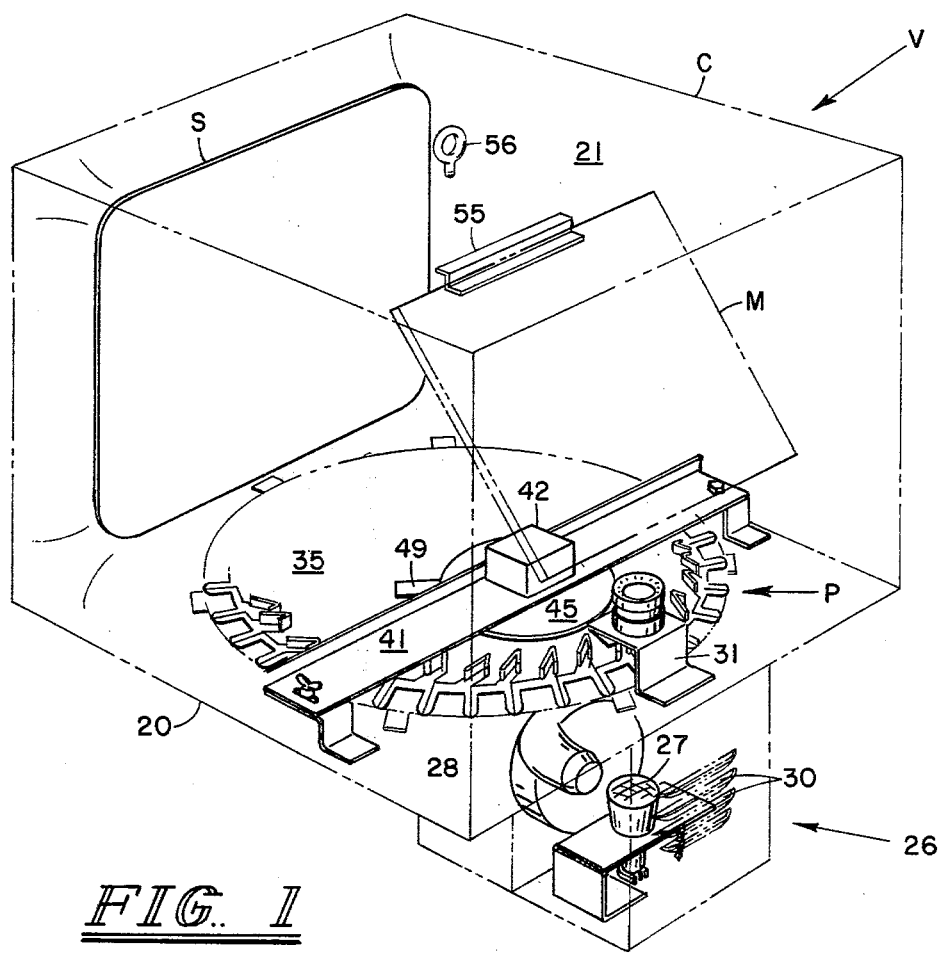
FIG. 1 is a perspective view showing the projection system of the viewing device.

Referring to the drawings, there is shown in FIG. 1 the viewing device V. The viewing device V includes a cabinet or enclosure C having a screen S. A projection means P is provided for projecting images from transparencies onto a mirror M which reflects the images to the screen S for viewing.

The cabinet enclosure C includes a box-like structure having a base 20, top 21, and side walls 22 and 23. A rear wall 24 is provided and a removable front wall member 25 to which is mounted the screen S is also provided. The front wall 25 is mounted for removal for access to the projection means P for servicing and changing transparencies on the projection means.

Figure 5:
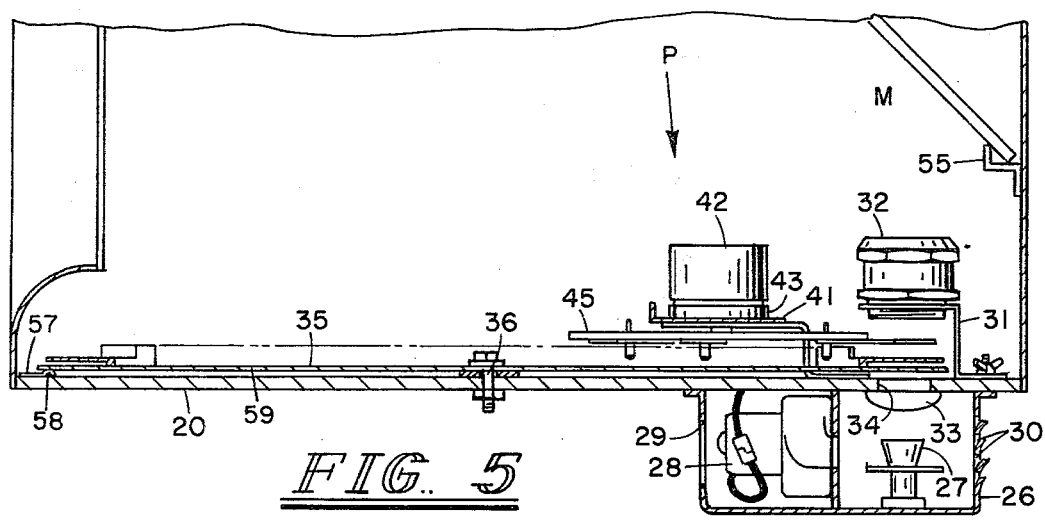
FIG. 5 is a cross sectional view of the slide changing mechanism of the viewing device.

A light source 26 which forms an enclosed box-like structure is secured to the base 20. The light source 26 includes a lamp 27 and motor-operated fan means 28 for providing cooling for the lamp 27. Suitable wiring is provided for connecting an electrical source with the motor-operated fan means 28 and lamp 27, as is well known in the art. As shown in FIG. 5, the lamp source 26 includes openings 29 and 30 for passage of air for cooling of the lamp. Secured to the upper surface of the base 20 is a lens support bracket 31 to which is mounted a conventional camera lens 32. A suitable condenser 33 is secured to the lower surface of the base 20 for projecting light rays through the opening 34.

Figure 6:
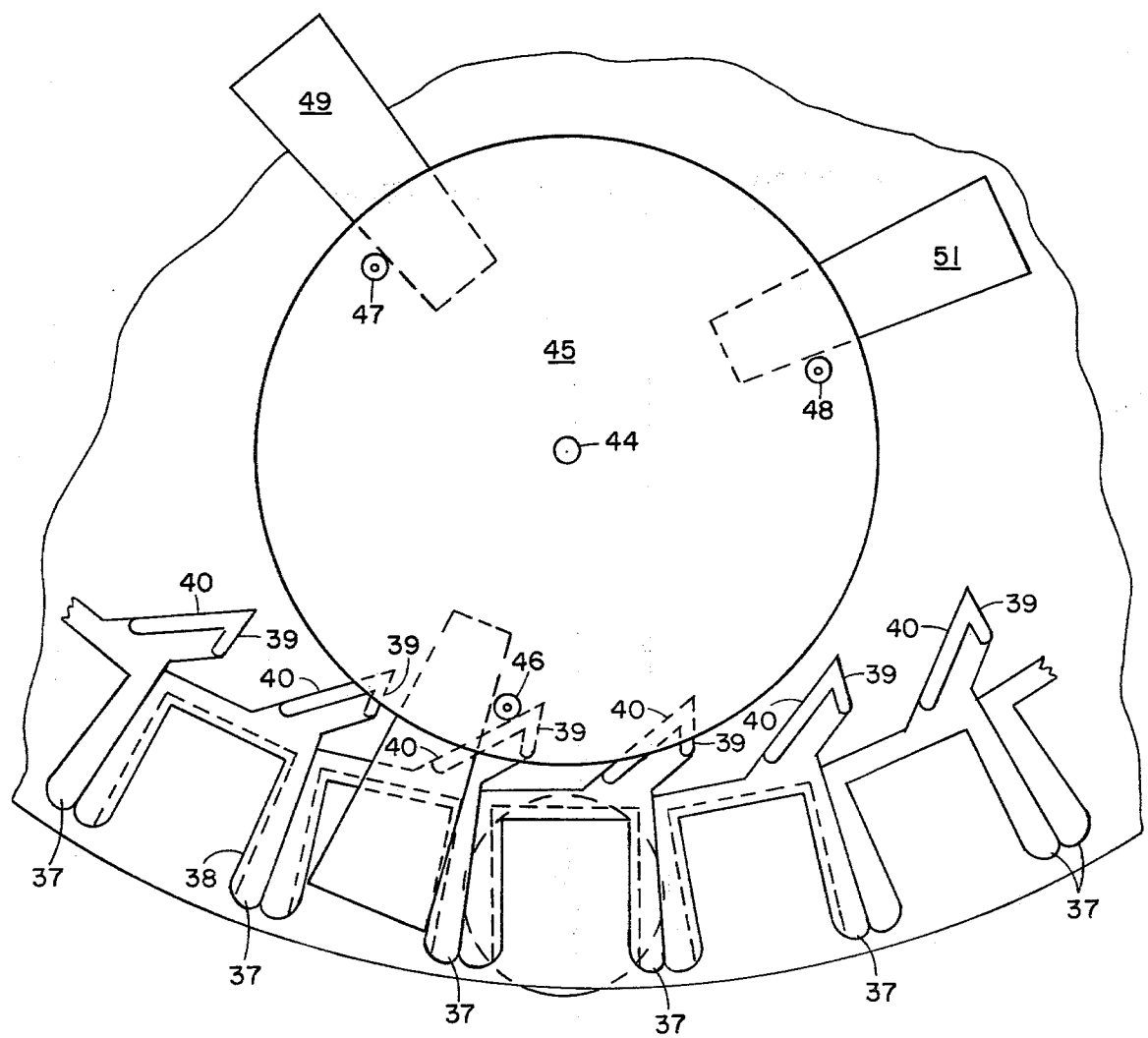
FIG. 6 is a broken view of the slide holders and the drive mechanism.

A rotating disc 35 is mounted for rotation about pivot axis 36 as best shown in FIG. 5. The disc 35 is free to rotate about the vertical pivot axis 36, so as to selectively place a slide holder 37 between the lamp and lens. Each slide holder 37 is identical and as best shown in FIG. 1, a plurality of transparency or slide holders are mounted about the periphery of the disc 35. The disc 35 is preferably formed of transparent plastic for passing of light through the transparency inserted in each slide or transparency holder so as to project an image through the lens 32. An opaque disc with a plurality of apertures could also be used. As best shown in FIG. 6, each slide holder 37 includes a groove 38 in which a conventional photographic slide may be inserted. Each slide or transparency holder 37 includes an indexing cog 39 having an inclined camming surface 40 for purposes explained hereinafter. Each slide holder is preferably formed integrally with the index cog using conventional plastic injection techniques.

Figure 4:
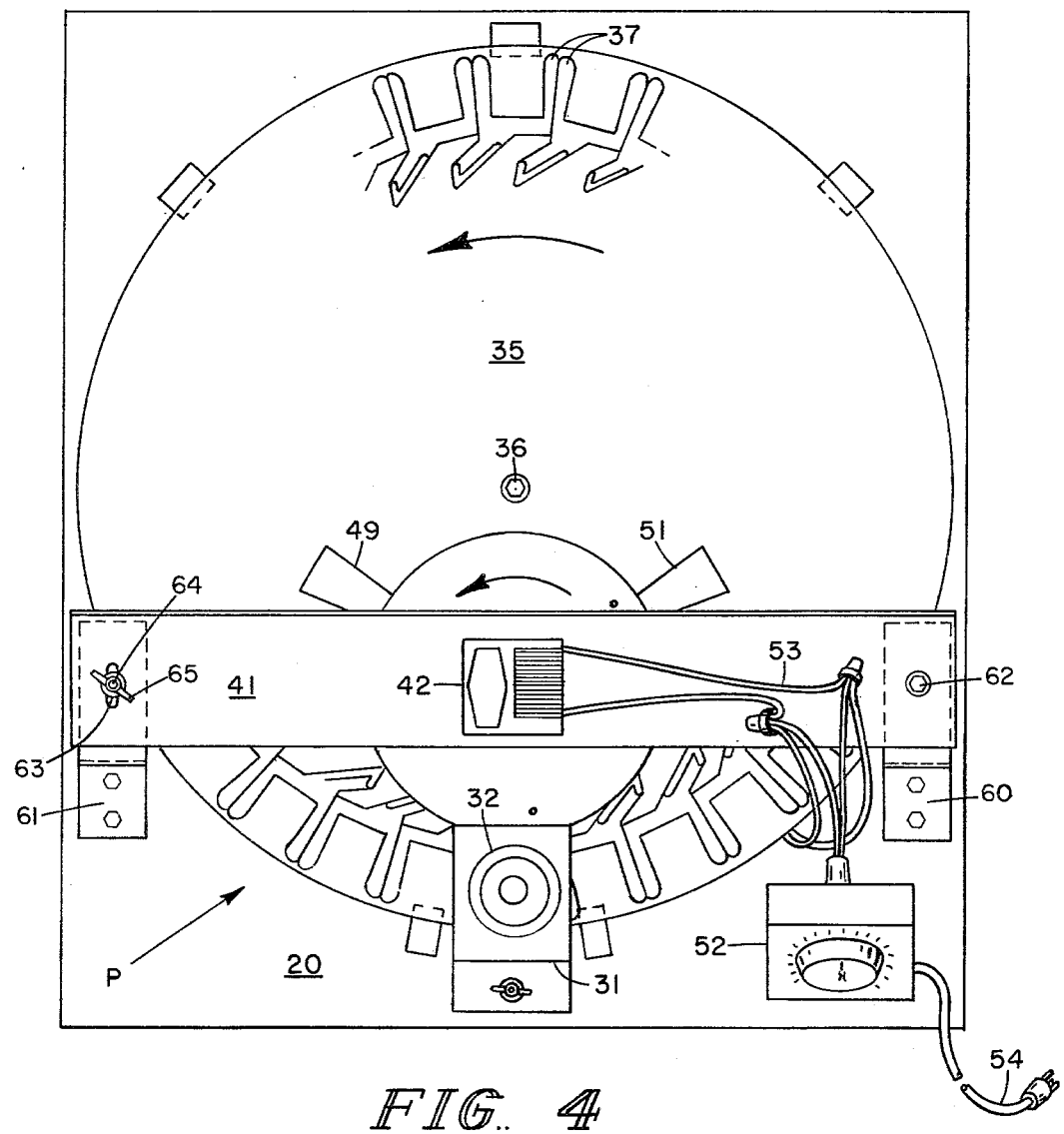
FIG. 4 is a plan view of the slide changing mechanism of the viewing device.

Mounted above the rotating disc 35 is a support bracket 41 which is secured to the upper surface of the base 20 and extends across the base as shown in FIGS. 1 and 4. An electric motor 42 having a suitable reduction gearing means 43 is secured to the bracket 41 and includes a downwardly extending vertical drive shaft 44.

A rotating drive wheel means 45 is secured to the vertical drive shaft 44 and includes three drive pins 46, 47 and 48 which are preferably nylon rollers. As best shown in FIGS. 5 and 6, the drive pins or rollers 46, 47 and 48 are positioned to engage the camming surfaces 40 upon rotation of the drive wheel means 45 to cause the discs 35 to rotate in increments to align the transparency holder with the lamp 27 and lens 32. Engagement of each drive pin with the camming surface 40 is clearly shown in FIG. 6 and will cause the roller to smoothly slide along the camming surface for each increment of rotation of the disc 35. A plurality of shutters 49, 50 and 51 are provided for blocking light from passing through the lens 32 until a new transparency is positioned between the lamp and lens. The shutters block the light momentarily passing through the lens, as the disc 35 is rotated to successively position transparencies between the lamp and lens. The number and position of the drive pins on the drive wheel determines the time interval during which each slide is positioned between the lamp and lens for projection on the screen. This time interval can be increased by decreasing the number of drive pins and shutters, and decreased by increasing the number of drive pins and shutters. Each time a pin on the drive wheel engages a camming surface on the rotating disc, a slide is changed. Accordingly the time interval during which a particular slide is projected on the screen is determined by the number and angler spacing of the pins on the drive wheel.

Figure 3:
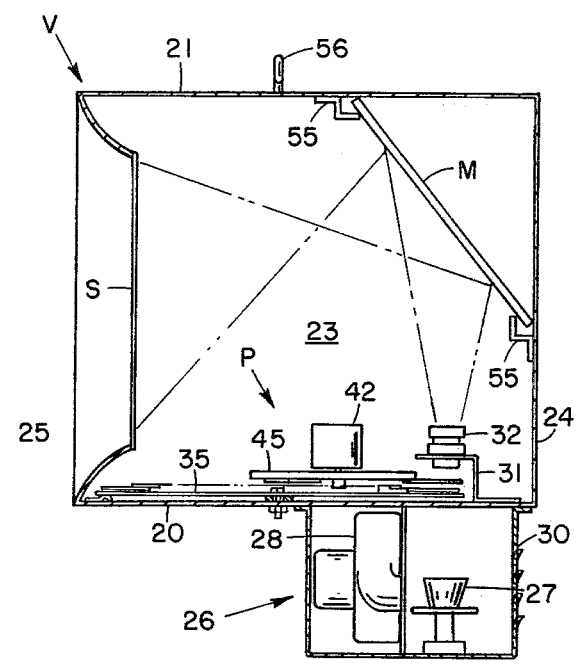
FIG. 3 is a side elevation and view in cross section of the viewing device.

A timer mechanism 52 is provided to supply electrical current through wiring 53 which is connected to the motor 42, fan motor 28 and lamp 27. The timer 52 is connected through a cord 54 to a conventional 110 outlet. Light weight mirror M is positioned at an angle above the lens in brackets 55 in FIG. 5. An image projected through the lens 32 is reflected from the mirror M, as best shown in FIG. 3, onto the screen S for viewing by customers.

As will be apparent from the above description, other than the motors 28 and 42, only two moving parts are provided. The only moving parts are disc 35 and drive wheel means 45. The minimum number of moving parts simplifies the manufacture and maintenance of the device, so as to render the device substantially maintenance-free over long periods of time. The mounting of the shutters on the drive wheel means eliminates an additional moving part and simplifies manufacture. A plurality of brackets 57 are mounted around the periphery of the disc 35, each with a tip portion 58 engaging the lower surface 59 of the disc as shown in FIG. 5. As is apparent, the tip portion acts to maintain the disc 35 steady which will maintain the slides in focus.

The support bracket 41 is mounted on two L-shaped members 60 and 61 as shown in FIG. 1 which are secured by bolts to base 20. One end of the support bracket 41 includes a bolt 62 to pivotally secure the support bracket to the L-shaped member 60. The other end of the support bracket 41 includes a slot 63 which is secured to the L-shaped bracket by a bolt 64 having a wing nut 65. As is apparent in FIG. 4, loosening of the wing nut 65 will permit pivoting of the bracket 41 about the bolt 62 within the limits of slot 63. Pivoting of the support bracket 41 will necessarily move the drive wheel means 45 toward and away from the index cogs to vary the point of engagement of the dry pins or rollers 46, 47 and 48 with the camming surfaces 40. Due to the angle of the camming surfaces as shown in FIG. 6, the point of engagement of the rollers with the camming surfaces will necessarily determine the amount of incremental rotation of the disc 35 for displaying each slide. Accordingly, the slot 63 allows adjustment of the support bracket 41 to accurately position each transparency holder 37 at the proper position between the lens 32 and lamp 27. This reduces the need for very close manufacturing tolerances which facilitates ease of assembling the components and hence can keep costs down.

Figure 2:
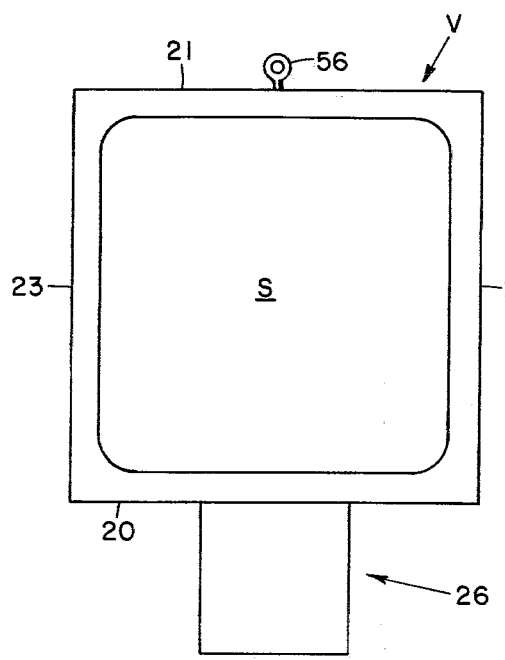
FIG. 2 is a front elevation view of the viewing device.

Typically, the viewing device V can be positioned for easy viewing in a store and includes a hook 56 for attachment to the ceiling. The device may also be mounted upon a stand when desired. In order to place the device in operation, suitable transparencies are inserted in each slide holder 37 by removal of the front wall 25 and screen S. The front wall 25 may then be positioned as shown in FIGS. 1, 2 and 3 and the timer 52 may be set to activate the motors 42 and 28 and lamp 27 at predetermined times. In the case of a disc 35 which includes thirty slide holders, each slide may be on the screen for approximately two seconds, giving a total cycle time of seventy-five seconds for thirty ads including the time interval between changing of slides when the shutter blocks the light path. The vertical positioning of the axis 36 with the disc 35 in a horizontal plane maintains the slides equidistant from the lens 32 to maintain correct focus without any additional mechanism. The basic format composition for each slide is a color transparency of the product with a very short descriptive overlay that may include such information as the price and store name. The screen S may be typically a thirty-two inch diagonal screen of suitable projection material which renders the ads clearly visible when projected thereon, even in a fully lighted environment. The enclosure C enables an ad to be viewed on the screen without darkening of the room in which the device is installed. When it is desired to change ads, the front wall 25 may be simply removed and each ad may be changed as desired by inserting the transparencies in the slide holders.

While there has been shown and described a preferred embodiment of an automatic slide viewing apparatus in accordance with the invention, it will be appreciated that many changes and modifications may be made therein without, however, departing from the essential spirit of the invention within the scope of the claims.

What is claimed is:

1. An automatic slide viewing apparatus, comprising:
   an enclosure with a projection screen mounted with the enclosure for viewing images projected from transparencies;
   a rotating disc mounted for rotation about a generally vertical axis within the enclosure and having a plurality of transparency holders for mounting transparencies about the periphery of the disc;
   a light and lens mounted in the enclosure for projection of a transparency image on the screen;
   a plurality of index cogs, each having inclined camming surfaces mounted on the disc and a rotating drive wheel means having drive pins for engaging the inclined camming surfaces of the index cogs to rotate the disc in the increments to selectively align a transparency holder for a predetermined time between the light and lens;
   a mirror mounted within the enclosure for reflecting the image projected by the lens to the projection screen;
   a shutter means mounted for rotation with the drive wheel means for positioning between the lens and light for each incremental rotation of the disc;
   the drive pins are rollers for smooth engaging and releasing of the index cogs; and
   the shutter means includes a plurality of opaque blades mounted on the drive means for sequentially positioning between the lens and light.

2. The apparatus as set forth in claim 1, wherein: an index cog is mounted adjacent each transparency holder.

3. The apparatus as set forth in claim 1, wherein: the mirror is positioned above the disc for reflecting an image on the screen.

4. The apparatus as set forth in claim 1, including: a timer for controlling the drive wheel means.

5. The apparatus as set forth in claim 1, wherein:
   each slide holder and index cog are integrally formed as a one-piece construction.

6. The apparatus as set forth in claim 1, wherein:

the disc is formed of transparent material.

7. An automatic slide viewing apparatus comprising:
an enclosure and a projection screen for viewing images from transparencies;
a rotating disc mounted within the enclosure and having a plurality of transparency holders for mounting transparencies about the periphery of the disc;
a plurality of index cogs each having an inclined camming surface, mounted on the disc and a rotating drive wheel means having drive pins for engaging an inclined camming surface of the index cogs to rotate the disc in increments to selectively align a transparency holder for a predetermined time between a light and lens mounted in the enclosure for projection of a transparency image on the screen; and
said rotating drive wheel means having an adjusting means for movement of the axis of rotation of the drive wheel means relative to the axis of rotation of the rotating disc to vary the point of engagement of the drive pins with the index cogs to provide a predetermined incremental rotation of the disc to accurately position each transparency holder between the light and lens.

8. An automatic slide viewing apparatus, comprising:
an enclosure with a projection screen mounted with the enclosure for viewing images projected from transparencies;
a rotating disc mounted for rotation about a generally vertical axis within the enclosure and having a plurality of transparency holders for mounting transparencies about the periphery of the disc;
a light and lens mounted for rotation about a generally vertical axis within the enclosure and having a plurality of transparency holders for mounting transparencies about the periphery of the disc;
a light and lens mounted in the enclosure for projection of a transparency image on the screen;
a plurality of index cogs, each having inclined camming surfaces mounted on the disc and a rotating drive wheel means having drive pins for engaging the inclined camming surfaces of the index cogs to rotate the disc in the increments to selectively align a transparency holder for a predetermined time between the light and lens;
a mirror mounted within the enclosure for reflecting the image projected by the lens to the projection screen;
a shutter means mounted for rotation 360° with the drive wheel means for positioning between the lens and light for each incremental rotation of the disc; and
means mounting the drive wheel means for adjustment relative to the enclosure to vary the point of engagement of the drive pins with the index cogs to provide a predetermined incremental rotation of the disc to accurately position each transparency holder between the light and lens.

* * * * *